US009738855B2

(12) United States Patent
Agarwal

(10) Patent No.: US 9,738,855 B2
(45) Date of Patent: Aug. 22, 2017

(54) PROCESS FOR CONVERTING LOW AND HIGH FREE FATTY ACID CONTAINING OILS INTO NO FREE FATTY ACID CONTAINING OILS AND ASSOCIATED SYSTEMS AND DEVICES

(71) Applicant: Technochem, Boone, IA (US)

(72) Inventor: Sanjeev Agarwal, Boone, IA (US)

(73) Assignee: Tehnochem, Boone, IA (US)

( * ) Notice: Subject to any disclaimer, the term of this patent is extended or adjusted under 35 U.S.C. 154(b) by 0 days.

(21) Appl. No.: 15/016,829

(22) Filed: Feb. 5, 2016

(65) Prior Publication Data

US 2016/0152924 A1 Jun. 2, 2016

Related U.S. Application Data

(63) Continuation-in-part of application No. 13/758,408, filed on Feb. 4, 2013, now Pat. No. 9,365,801.

(51) Int. Cl.
| | |
|---|---|
| C11B 3/00 | (2006.01) |
| C11B 3/12 | (2006.01) |
| C11B 3/14 | (2006.01) |
| C11C 1/00 | (2006.01) |
| C11C 1/02 | (2006.01) |
| C11C 3/00 | (2006.01) |
| C11C 3/02 | (2006.01) |

(52) U.S. Cl.
CPC ....... *C11C 3/02* (2013.01); *C11B 3/14* (2013.01); *C11C 1/02* (2013.01); *Y02E 50/13* (2013.01)

(58) Field of Classification Search
CPC ......... Y02E 50/00; Y02E 50/10; Y02E 50/13; C11B 3/00; C11B 3/12; C11B 3/14; C11C 1/00; C11C 1/02; C11C 3/00; C11C 3/02
See application file for complete search history.

(56) References Cited

U.S. PATENT DOCUMENTS

| | | | |
|---|---|---|---|
| 2,383,596 A | 8/1945 | Dreger | |
| 2,383,601 A | 8/1945 | Keim | |
| 2,494,366 A | 1/1950 | Sprules et al. | |
| 2,808,421 A | 10/1957 | Brokaw et al. | |

(Continued)

OTHER PUBLICATIONS

Canakci et al., "Biodielsel Production from Oils and Fats with High Free Fatty Acids", "Transactions of the American Society of Agricultural Engineers", , pp. 1429-1436, vol. 44, No. 6.

(Continued)

*Primary Examiner* — Natasha Young
(74) *Attorney, Agent, or Firm* — Davis, Brown, Koehn, Shors & Roberts, P.C.; Matthew Warner-Blankenship

(57) ABSTRACT

The disclosed apparatus, systems and methods relate to the conversion of high free fatty acid ("HFFA") containing oils defined as oils containing 20-100% free fatty acids ("FFA") and low free fatty acid ("LFFA") containing oils defined as oils containing 1-20% free fatty acids (FFA) into oil with less than about 0.5-1% FFA. If the feedstock is HFFA oil, the process includes a combination of partial glycerolysis of HFFA oils to produce LFFA oils and subsequent stripping of LFFA oils to produce NFFA oils via steam distillation. If the feedstock is LFFA oil, the process includes stripping of LFFA oils to produce NFFA oils via steam distillation and subjecting FFA to partial glycerolysis to convert FFA to oil.

7 Claims, 7 Drawing Sheets

(56) References Cited

U.S. PATENT DOCUMENTS

| | | | |
|---|---|---|---|
| 2,875,221 | A | 3/1958 | Birnbaum |
| 3,102,129 | A | 8/1963 | Birnbaum et al. |
| 3,459,736 | A | 8/1969 | Dalibor |
| 4,089,880 | A * | 5/1978 | Sullivan .................. C11B 3/001 554/176 |
| 4,101,414 | A * | 7/1978 | Kim ................. C10M 175/0033 208/18 |
| 4,164,506 | A | 8/1979 | Kawahara et al. |
| 4,267,393 | A | 5/1981 | Torck et al. |
| 4,303,590 | A | 12/1981 | Tanaka et al. |
| 4,698,186 | A | 10/1987 | Jeromin et al. |
| 4,956,286 | A | 9/1990 | Macrae |
| 5,399,731 | A | 3/1995 | Wimmer |
| 5,697,986 | A | 12/1997 | Haas |
| 5,713,965 | A | 2/1998 | Foglia et al. |
| 5,908,946 | A | 6/1999 | Stern et al. |
| 6,261,812 | B1 | 7/2001 | Yamada et al. |
| 6,399,800 | B1 | 6/2002 | Haas et al. |
| 6,423,857 | B1 | 7/2002 | Copeland et al. |
| 6,500,974 | B2 | 12/2002 | Thengumpillil et al. |
| 7,670,634 | B2 * | 3/2010 | Kellens .................. B01D 3/346 426/487 |
| 7,806,945 | B2 | 10/2010 | Jackam et al. |
| 7,871,448 | B2 | 1/2011 | Jackam et al. |
| 8,088,183 | B2 | 1/2012 | Jackam et al. |
| 2003/0083514 | A1 | 5/2003 | Boocock |
| 2012/0123140 | A1 | 5/2012 | Jackam et al. |
| 2013/0287925 | A1 * | 10/2013 | Schols .................... A23D 9/04 426/601 |

OTHER PUBLICATIONS

Davis Clements, "Pretreatment of High Free Fatty Acid Feedstocks", "Biodiesel Production Technology Workshop III", Mar. 26, 2003, p. 78c-78i.

Felizardo et al., "Study on the Glycerolysis Reaction of High Free Fatty Acid Oils for Use as Biodiesel Feedstock", "Fuel Processing Technology", Jun. 1, 2011, pp. 1225-1229, vol. 92, No. 6.

Kumoro, "Experimental and Modeling Studies od the Reaction Kinetics of Alkaline-Catalyzed used Frying Oil Glycerolysis Using Isopropyl Alcohol as a Reaction Solvent", "Research Journal of Applied Sciences, Engineering and Technology", , pp. 869-876, vol. 4, No. 8.

Noureddini et al., "Glycerolysis of Fats and Methyl Etsers", "Journal of the American Oil Chemists' Society", pp. 419-425, vol. 74, No. 4.

Sonntag, "Flycerolysis of Fats and Methyl Esters—Status, Review, and Critiquie", "Journal of American Oil Chemists' Society", , pp. 795A-802A, vol. 59.

Tyson, "Biodiesel Technolgy and Feedstocks", "National Renewable Energy Laboratory", pp. 1-37.

K. Shaine Tyson, "Brown Grease Feedstocks for Biodiesel", "National Renewable Energy Laboratory", pp. 1-33.

Chihata, "Koteika Kosa (Immobolized Enzyme)", Kodansha Ltd. Publishers, pp. 9-85.

Chihata, "Koteika Seitai-shokubai (Immobolized Biocatalyst)", Kodansha Ltd. Publishers, pp. 12-101.

* cited by examiner

PROCESS FOR CONVERTING LOW AND HIGH FREE FATTY ACID CONTAINING OILS INTO NO FREE FATTY ACID CONTAINING OILS AND ASSOCIATED SYSTEMS AND DEVICES

CROSS-REFERENCE TO RELATED APPLICATION(S)

This application is a continuation-in-part of U.S. application Ser. No. 13/758,408, now U.S. Pat. No. 9,365,801, filed Feb. 3, 2013 and entitled "Process of Converting Low and High Free Fatty Acid Containing Oils Into No Free Fatty Acid Containing Oils," which is hereby incorporated by reference in its entirety under 35 U.S.C. §119(e).

TECHNICAL FIELD

The disclosure relates generally to oils for use as biodiesel feedstock and, more particularly, to improved processes and systems for refining low free fatty acid oils and high free fatty acid oils for use as biodiesel feedstock.

BACKGROUND

Biodiesel, defined as fatty-acid alkyl ester ("FAAE"), is most commonly produced by a process of trans-esterification of triglycerides. The process involves reacting oils and fats with alcohol, usually methyl alcohol, in the presence of an alkaline catalyst. The conversion of triglycerides with alkaline catalysis is described in U.S. Pat. Nos. 2,383,601 and 2,494,366. The process is most efficient when the feedstock is a pure glyceride (refined oils and fats) containing very low levels (typically lower than 1%) of free fatty acids ("FFA" which, for all practical purposes, is called a "No" FFA ("NFFA") oil. Unfortunately, the price of NFFA oil has increased dramatically over the last several years rendering it impossible to produce biodiesel from such feedstocks and compete with petro-diesel. While cheaper feedstocks are available, they contain impurities (including greater than 1% FFAs) that require additional processing, thus increasing the cost of producing biodiesel. The challenge is to develop processes that can convert oils containing higher than 1% FFA into NFFA oils; thus producing a cheaper feedstock for producing biodiesel.

The literature includes a number of approaches of dealing with FFA (see, Tyson, Shaine K., "Brown Grease Feedstocks for Biodiesel," 2002, pp. 1-34, National Renewable Energy Laboratory, Boulder, Colo.) (www.nrbp.org/pdfs/pub32.pdf). One of the options is to strip the FFAs from the oil. This is a well-known process, also known as physical refining or steam distillation. In this process, the FFA is stripped (evaporated) from the oil under vacuum. The FFA is condensed and recovered. The advantage of this process is that it produces oil that is practically free of FFAs and a very good feedstock for producing biodiesel. A challenge with this process is that there is a reduction in the amount of oil available to produce biodiesel due to loss of FFA and some neutral oil during the stripping process. Consequently, the higher the FFA the higher the yield loss and the lower the attractiveness of this approach. An example of this process of recovering fatty acids is set out in U.S. Pat. No. 6,423,857. This patent focuses on pre-treating high phospholipid containing oil (such as soybean oil) prior to steam distillation and subjecting the oil to steam distillation that produces a distillate containing at least about 97 percent by weight free fatty acids. It is well-known that soybean oil typically contains only about 0.6% FFA, therefore the losses are limited. With higher FFA oils, the losses will be greater.

Another option is to react the FFAs with an alcohol, usually methyl alcohol, in the presence of an acid catalyst to produce FAAE. For instance, U.S. Pat. No. 4,164,506 discloses a biodiesel synthesis wherein fatty acids are subjected to acid catalysis. This process is called acid esterification and would be very attractive if it could convert all FFA into FAAEs. Unfortunately, this process poses several challenges: (a) un-reacted or unconverted FFA left in the oil after esterification must be removed with additional intermediate steps and equipment; (b) the esterification process requires use of acidic catalyst which poses risk to people (risk of burning skin and flesh upon contact) as well as equipment (risk of corrosion upon contact); and (c) the esterification process requires a large quantity of excess methanol (needed to maintain the proper equilibrium for advancing the reaction which is inhibited by the formation of water during esterification) thus increasing the emission of volatile substance in the atmosphere. The acid esterification is especially unattractive when the FFA content is higher because a large amount of acid catalyst and methyl alcohol are required in order to convert feedstocks having high FFA content. Since the acid catalyst must be neutralized with alkali before processing the glycerides, the increased catalyst loading results in an excessive amount of salts produced as a consequence of alkali neutralization. Further, such processes generate a large volume of waste water as revealed in the disclosures of U.S. Pat. Nos. 4,303,590, 5,399,731 and 6,399,800.

Alternatively, solid catalysts can be used for the acid esterification reaction to avoid a neutralization step before the transesterification reaction. These processes have been extensively explored and documented, such as in U.S. Pat. No. 3,459,736 (which uses titanium oxide as a catalyst), U.S. Pat. No. 4,698,186 (which utilizes various solid catalysts), U.S. Pat. No. 4,267,393 which uses sulfonated resins as solid acid catalysts and U.S. Pat. No. 5,908,946 which employs zinc and aluminum oxide as catalysts for the esterification reaction).

U.S. Pat. Appl. No. 2003/0083514 discloses a single-phase process for production of fatty acid methyl esters from mixtures of triglycerides and fatty acids. This process is limited in that it requires acid catalyzed esterification of fatty acids prior to the transesterification step. U.S. Pat. No. 2,383,596 discloses a method for esterifying fatty acid and trans-esterifying glycerides. This process is limited in that only an esterification step is disclosed.

A third option is enzymatic catalysis. The conversion of both free fatty acids and triglycerides with enzyme catalysis is disclosed in U.S. Pat. Nos. 4,956,286, 5,697,986 and 5,713,965. A representative example of the esterification or transesterification method is disclosed in JP-B 6-65311, in which fatty acids or lower alcohol esters thereof are reacted with glycerol (or glycerin) in the presence of an immobilized lipase having 1,3-position selectivity and the by-product water or lower alcohol formed by the reaction is removed from the system at a reduced pressure to obtain the diglycerides. This reaction is preferably conducted in the presence of an enzyme having an ester activity, such as a lipase or an esterase, preferably in the presence of an immobilized or intracellular lipase having 1,3-position selectivity. Known methods for immobilization are described, for example, In "Koteika Koso (Immobilized Enzyme)," edited by Ichiro Chihata, published by Kodansha Ltd. Publishers, pp. 9-85 and "Koteika Seitai-shokubai (Immobilized Biocatalyst)" edited by Ichiro Chihata, published by Kodansha Ltd. Publishers, pp 12-101. Immobilization onto an ion-exchange resin is preferred. Lipases having 1,3-position selectivity and usable in immobilization include those derived from microorganisms of, for example, the genera *Rhizopus, Aspergillus, Mucor*, etc., as well as pancreatic lipases, and the like. For example, use can be made of the lipases derived from *Rhizopus delemar, Rhizopus japonicus, Rhizopus niveus, Aspergillus niger, Mucor javanicus*, and *Mucor miehei*. A commercial immobilized lipase having 1,3-position selectivity is Lipozyme® IM, manufactured by Novo-Nordisk Bioindustry A.S. An intracellular lipase having 1,3-position selectivity comprises a lipase having 1,3-position selectivity adsorbed or bonded to microbial cells. A commercially available example thereof is Olipase™, manufactured by Nagase & Co., Ltd.

This process is challenging because the reaction produces water which inhibits the forward reaction. Other problems with enzymatic processing are the slow reaction rates and high cost of enzymatic catalysts. Further, enzymatic catalysts have a limited life. These shortcomings when compared to alkaline and acidic reactions render the enzymatic processes economically unfavorable.

A fourth option is described in US Pat. Appl. No. 2012/0123140 involving glycerolysis of high free fatty acid (HFFA) oil. This process converts FFAs into oils through esterification of fatty acids with glycerol. The resulting product is oils which are fatty acid glycerin esters (or FAGE). This process is variously known as glycerolysis, alcoholysis, or esterification. Glycerolysis of fats and oils with glycerol has been intensively researched during the 1940's and 1950's. Sonntag (1982) (Sonntag, N.O.V., glycerolysis of Fats and Methyl Esters—Status, Review, and Critique, Journal of American Oil Chemists Society 59:795A-802A) has a complete collection of these patents in his review. The reaction produces a mixture of mono-, di- and tri-glycerides.

For example, U.S. Pat. No. 3,102,129 discloses a process for producing monoglycerides of fatty acids and U.S. Pat. No. 2,875,221 discloses a process for preparing monoglycerides of fatty acids. These processes are limited in that they require admixing a substantial proportion of previously reacted monoglyceride product with a freshly mixed stream of glycerol and fat and rapidly heating the mixture on a hot surface. U.S. Pat. No. 6,500,974 discloses a process for preparation of a monoglyceride. This process is limited in that the presence of a food grade polar solvent is required in the glycerolysis reactor.

Although the esterification or transesterification method is a process in which fatty acids or lower alcohol esters thereof and glycerol are converted to partial diglycerides through a one-step reaction, it is not cost efficient because the individual feedstock materials are expensive. For conducting the second stage esterification reaction, glycerol is added to the partial decomposition product, obtained through the first-stage reaction in such an amount that the mole number of fatty acid groups in the decomposition product mixture of the first stage is from 0.8 to 2.5 mol per 1 mol of glycerol groups based on the total of glycerol groups of the decomposition product mixture of the first stage and glycerol groups added to the second stage (see, e.g., U.S. Pat. No. 6,261,812).

On the other hand, U.S. Pat. No. 2,808,421 discloses a method for preparing mixed triglyceride compositions using a titanium alcoholate catalyst. U.S. Pat. Nos. 7,806,945, 8,088,183, 7,871,448, and US. Pat. Appl. No. 2012/0123140, disclose a process for preparation of fatty acid methyl ester using HFFA oil. The process includes glycerolysis as part of their overall process. The conditions taught for glycerolysis of free fatty acids (at a temperature of about 220° C. and at a pressure of about 2 pounds per square inch absolute) in a glycerolysis reaction without a catalyst to produce a glycerolysis reactor effluent stream that contains less than 0.5 percent by weight of free fatty acids and a plurality of glycerides, are similar to other literature. These patents teach there is a need for at least two continuous stirred tank reactors that are operated in series with a combined residence time of not more than about 500 minutes. For a 20% FFA stream, the time taken is no more than 200 minutes. A problem with this approach is that, despite claims to the contrary, it only efficiently reduces the FFA by 80-90%, thus making it necessary to either use catalysts or add intermediate steps and equipment to reduce the remaining FFA either chemically or physically. Moreover, the size of glycerolysis reactors is large because it is sized to handle the entire mass of oil even though the FFA content is a relatively small portion of that stream and consequently there is a waste of energy because a greater amount of material (the entire HFFA oil stream) is subject to higher temperature and then cooled down when it is only necessary to heat the FFA.

The background art is also characterized by a number of non-patent publications. Noureddini et al. in *glycerolysis of Fats and Methyl Esters*, JAOCS, 1997, pp. 419-425, vol. 74, no. 4 discloses the glycerolysis of methyl esters and triglycerides with crude glycerin. The main focus of their study is on utilization of "crude" glycerol obtained from the biodiesel industry as opposed to "pure" glycerin previously used in glycerolysis to mono-, di-, and tri-glycerides. They did not disclose glycerolysis of fatty acids and their focus was on production of mono- and di-glycerides from FAME and tri-glycerides using crude glycerin.

Felizardo, et al. in "Study on the glycerolysis reaction of High Free Fatty Acid Oils for Use as Biodiesel Feedstock", Fuel Processing Technology, 2011, pp 1225-1229, vol 92, no. 6, discloses the conversion of oils with a high content of FFA (20-50%) by esterification with glycerol. The results suggest that the FFA content could be reduced from 50% to 5% in 3 hours at 200° C. without the use of a catalyst. The presence of a zinc-based catalyst reduced the reaction time to 1 hour and reduced the FFA to 1.2%.

Canakci, M. and J. Van Gerpen (2001) in Biodiesel Production from Oils and Fats with High Free Fatty Acids, Transactions of the American Society of Agricultural Engineers, 44(6):1429-1436 discloses that "glycerolysis" is an alternative process that can be used with feedstocks containing more than 10% FFAs. This involves adding glycerin at 400° F. and letting it react with the FFAs to form monoglycerides, a glycerol molecule to which one free fatty acid has been joined. These monoglycerides can then be processed using a standard alkaline catalyst transesterification process. Waste glycerin from biodiesel processing can be used in this process. Glycerolysis can be expensive because of the high heat involved, which requires a high-pressure boiler and trained boiler operator. Also, a vacuum must be applied while heating to remove water that is formed during the reaction. Another disadvantage is that the glycerin will also react with the triglycerides in the oil to convert some of them to monoglycerides. While this does not negatively impact the reaction, it means that more glycerin is required for the process, and therefore more glycerin must be removed at the end of the transesterification.

Kumoro in "Experimental and Modeling Studies of the Reaction Kinetics of Alkaline-Catalyzed used Frying Oil Glycerolysis using Isopropyl Alcohol as a Reaction Solvent, Research Journal of Applied Sciences, Engineering and Technology 4(8): 869-876, 2012, discloses a glycerolysis process using isopropyl alcohol and an alkaline catalyst. However, the focus of this and several other research is to convert tri-glycerides to mono-glycerides for use in foods, cosmetics, and pharmaceutical products. This study is not directly relevant to our invention because it does not address glycerolysis of fatty acids.

Tyson in Brown Grease Feedstocks for Biodiesel, WWW domain nrel.gov, 2002, pp. 1-33, National Renewable Energy Laboratory, Boulder, Colo., discloses techniques for converting greases to biodiesel. The techniques disclosed in this reference are limited. Moreover, the conditions taught for glycerolysis of free fatty acids are at temperatures in the range of 250° C. to 260° C. in the absence of a catalyst or at 220° C. with a catalyst. The reference teaches that there is "no proven technology for 50+% FFA mixes" and that "combined processes for ASTM [American Standard for Testing and Materials] quality biodiesel not well developed, technical and economic questions exist."

Tyson in Biodiesel Technology and Feedstocks, WWW domain nrel.gov, 2003, pp. 1-37, National Renewable Energy Laboratory, Boulder, Colo., includes much of the same information as contained in her 2002 presentation. The reference notes that using "glycerolysis to treat FFA" to "convert FFA to monoglycerides, then transesterify" is "commercial, not currently used in biodiesel."

Davis Clements in Pretreatment of High Free Fatty Acid Feedstocks, Biodiesel Production Technology Workshop III, Mar. 26-28, 2003, pp. 78c-78i, University of Nebraska, Lincoln, Nebr., discloses a number of methods for pretreatment of high free fatty acid feedstocks prior to transesterification. This process is limited in that glycerolysis is carried out at 200° C. under an 11 pounds per square inch vacuum, usually with a catalyst such as zinc chloride, with venting of water. This process is further limited in that, in the absence of a catalyst, a residence time of over 5 hours is required to achieve an effluent containing less than 1 percent free fatty acids.

BRIEF SUMMARY

We have listed the prior art and their merits and problems. Moreover, the goals of many prior art works pertaining to glycerolysis have been different. One stream of research has addressed the conversion of tri-glycerides to mono-glycerides for the purpose of producing emulsifiers used in foods, cosmetics, and pharmaceutical products. On the other hand, the goal of converting fatty acids to glycerides is more relevant to the disclosed systems and methods. Therefore, the attempt of the prior art has been to obtain close to full conversion of fatty-acids to glycerides. The goal of the disclosed systems and methods in the glycerin-esterification (glycerolysis) step is not to achieve full conversion of FFA into glycerides but rather to achieve about 80-95% conversion of FFA into glycerides. This can be achieved without the use of any catalyst and with less energy input. The glycerolysis is then coupled with FFA stripping to remove the remaining FFA to produce oil containing less than about 0.5% FFA or less than about 1.0% FFA. This combination of glycerin-esterification and subsequent stripping results in greater consistency of the final product.

Moreover, this combination process allows the flexibility to process Low Free Fatty Acid ("LFFA") and High Free Fatty Acid ("HFFA") oils in different ways to produce NFFA oils. Specifically, the disclosed systems and methods processes LFFA (containing from about 1% up to about 20% FFA) oil to an oil containing less than 1.0% FFA. This is accomplished by stripping the FFA from LFFA oil. The recovered FFA (which may have a concentration greater than 20% FFA) is then treated with glycerol to convert into glycerides (oil). The glyceride stream will contain 1-10% or more, up to 20% FFA that is returned to the front of the stripping process to remove the remaining FFA. This forms a closed loop wherein none of the FFA is wasted. In this implementation, the FFA remains in a closed loop where it is stripped from the LFFA oil and converted to glycerides by glycerolysis. Next, the oil returns to blend with the incoming LFFA oil. The resulting oil stripped of FFA that leaves the loop has less than about 0.5% FFA or less than about 1.0% FFA, and that is the product of interest. The disclosed systems and methods is a novel process for the conversion of HFFA oil (containing up to 100% FFA) to an oil containing as little as less than about 0.5% FFA or less than about 1.0% FFA. Through this novel combination process, these low-grade fatty materials that previously could not be utilized by existing processes are refined to biodiesel-ready feedstock by means of the invention disclosed herein. Since the cheapest feedstocks are the ones that have the highest FFA content, there is a need for a process that does not entail the shortcomings of existing processes described above. Such processes also need to reduce waste and energy consumption while increase yield. Further, the disclosed systems and methods combines several unit operations into an economical and unique process for the conversion of LFFA and HFFA to NFFA oils without wasting FFAs. The invention allows biodiesel producers to use NFFA feedstock.

One general aspect includes a method for producing oil having less than 1.0% free fatty acids from oil containing between about 1.0-20% free fatty acids, including the steps of purifying a stream of oil containing up to about 20% free fatty acid by steam distillation, where steam is used to strip the free fatty acids and produce a first stream of oil containing more than about 20% free fatty acid and a second stream of oil containing less than about 1.0% free fatty acid; recovering stripped fatty-acids from the first stream through condensation; reacting the recovered stripped free fatty acids with glycerin to produce glycerin-esterified oil containing about 0.2-20% free fatty acids; mixing the glycerin-esterified oil with the about 1.0-20% free-fatty acid containing oil and stripping the free fatty acids from the glycerin-esterified oil by steam distillation; recirculating any recovered free-fatty acids; and separating oil containing less than about 1.0% free fatty acid.

Implementations may include one or more of the following features. The method where deaeration of oil is performed at between about 70C and about 120C. The method further including pre-heating the stream of oil with hot refined oil in a series of economizers. The method further including flashing the pre-heated oil in a pre-distiller at between about 180 C and about 300 C. The method further including flashing the pre-heated oil in a pre-distiller at between about 1 mm and about 10 mm pressure. The method where to the steam stripping occurs at between about 180 C and about 300 C. The method where the stream oil is subject to steam stripping at between about 1 mm and about 10 mm pressure. The method where the stripped free fatty acid is recovered by condensing. The method further including collecting the purified free fatty acid in a fatty acid collection tank. The method where the recovering stripped fatty-acids from the first stream through condensation is performed at between about 160C and about 300C. The method recovering stripped fatty-acids from the first stream through condensation is performed on recovered FFA at a pressure of between about 10 mm to about 150 mm. The process further including reacting the recovered free fatty acids with glycerin to produce a fourth stream of oil. The system where the system is configured to react the stripped free fatty acids with glycerin at high temperature and low pressure to produce oil with up to about 20% free fatty acids. The system further including a scrubber configured to utilize cooled free fatty acids to scrub additional free fatty acid from steam vapors. The system where the free fatty acid stripper is configured to strip the free fatty acids from the oil by injecting steam at an elevated temperature and reduced pressure. The system further including a vacuum system. The system further including a first condenser configured to condense glycerol. The system further including a second condenser configured to condense water.

One general aspect includes a fatty acid stripping process, including: reacting the oil containing about 10-100% free fatty acids with glycerin to produce a stream of oil having up to about 20% free fatty acids; purifying the stream of oil having up to about 20% free fatty acids by steam distillation, where steam is used to strip the remaining free fatty acids and produce: a stream of oil that contains greater than 20% free fatty acid; and a stream of oil that contains less than 1.0% free fatty acid; recovering stripped free fatty acids from the stream of oil that contains less than 1.0% free fatty acid through condensation; mixing the stripped free-fatty acids with about 10-100% free-fatty acid containing oil and reacting the resulting stream with glycerin to produce a stream of oil having up to about 20% free fatty acids; recycling the stripped free fatty acids; and recovering a final oil having less than about 1.0% free fatty acid.

Implementations may include one or more of the following features. The process further including reacting the recovered free fatty acids with glycerin to produce a fourth stream of oil. The system where the system is configured to react the stripped free fatty acids with glycerin at high temperature and low pressure to produce oil with up to about 20% free fatty acids. The system further including a scrubber configured to utilize cooled free fatty acids to scrub additional free fatty acid from steam vapors. The system where the free fatty acid stripper is configured to strip the free fatty acids from the oil by injecting steam at an elevated temperature and reduced pressure. The system further including a vacuum system. The system further including a first condenser configured to condense glycerol. The system further including a second condenser configured to condense water.

One general aspect includes A system for producing oil having less than about 1.0% free fatty acids from an oil containing up to 100% free fatty acids, including: a reactor configured to react oil containing up to 100% free fatty acids with glycerin in the absence of a catalyst at high temperature and low pressure to produce a stream of oil having up to about 20% free fatty acids; a pre-distiller configured to purify the oil having up to about 20% free fatty acids by steam distillation at high temperature and low pressure; a free fatty acid stripper configured to steam-strip free fatty acids and produce oil having less than about 1.0% free fatty acids; and stripped free fatty acids; a fatty acid collection tank configured to recover the stripped free fatty acids through condensation; and a storage tank configured for collecting and storing oil having less than about 1.0% free fatty acids.

Implementations may include one or more of the following features. The system where the system is configured to react the stripped free fatty acids with glycerin at high temperature and low pressure to produce oil with up to about 20% free fatty acids. The system further including a scrubber configured to utilize cooled free fatty acids to scrub additional free fatty acid from steam vapors. The system where the free fatty acid stripper is configured to strip the free fatty acids from the oil by injecting steam at an elevated temperature and reduced pressure. The system further including a vacuum system. The system further including a first condenser configured to condense glycerol. The system further including a second condenser configured to condense water.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

EXAMPLE 1

LFFA Oil (i.e., Oil Containing Up to about 1-20% FFA)

Figure 1:
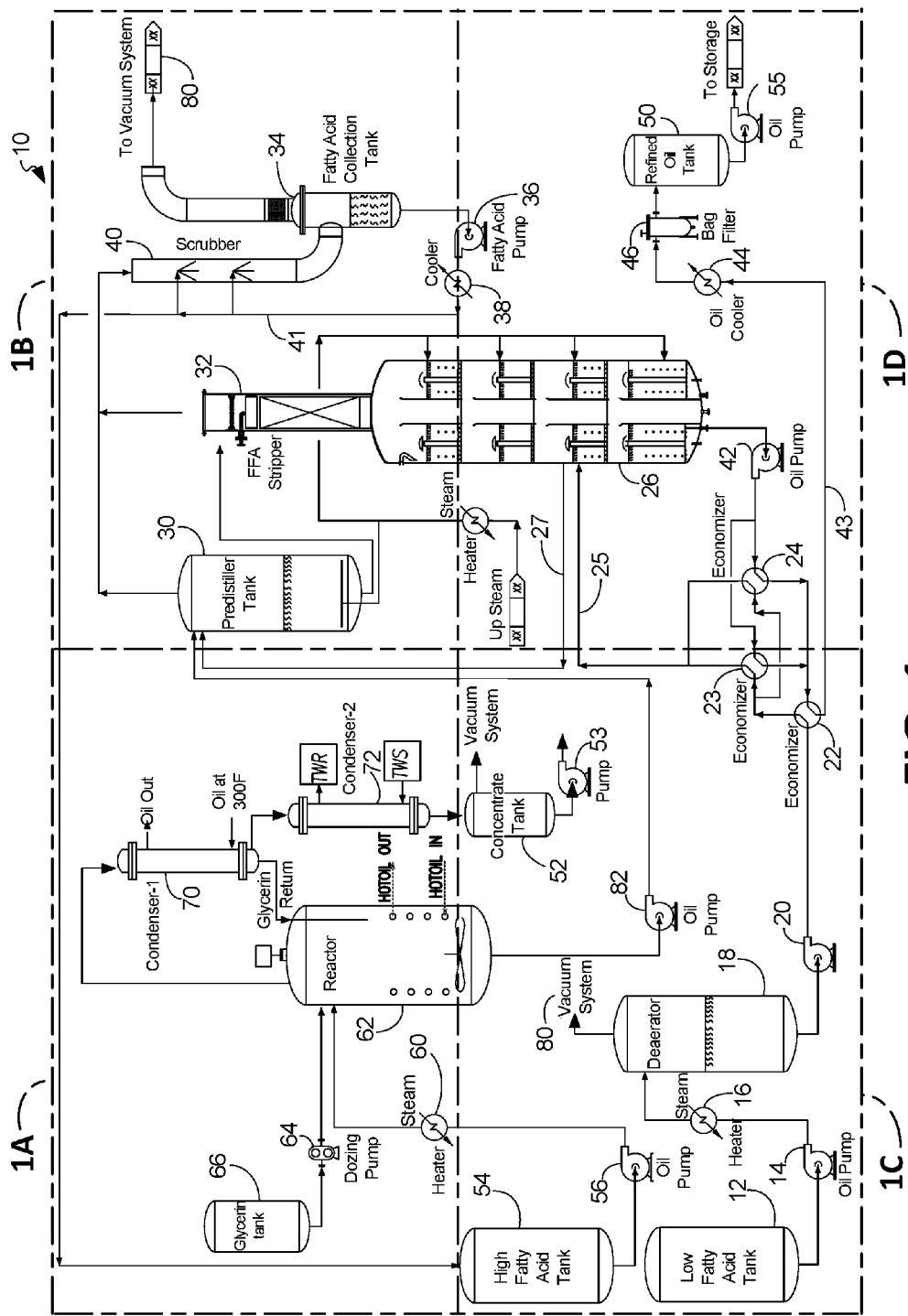
FIG. 1 is a schematic flow diagram of the process of glycerin esterification and FFA stripping, according to an exemplary embodiment.
Figure 1A:
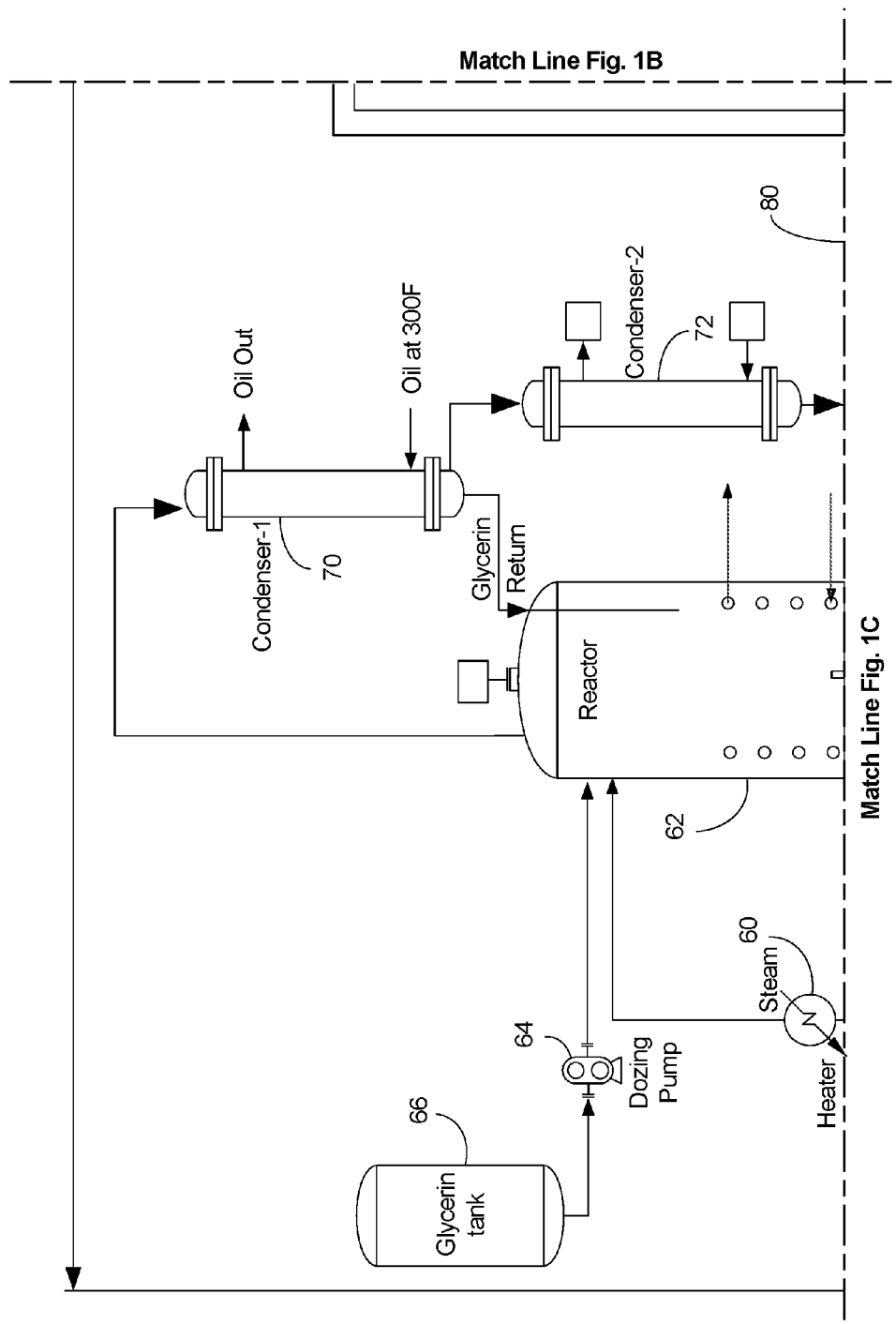
FIG. 1A is an expanded, detailed view of the upper left quarter of FIG. 1.
Figure 1B:
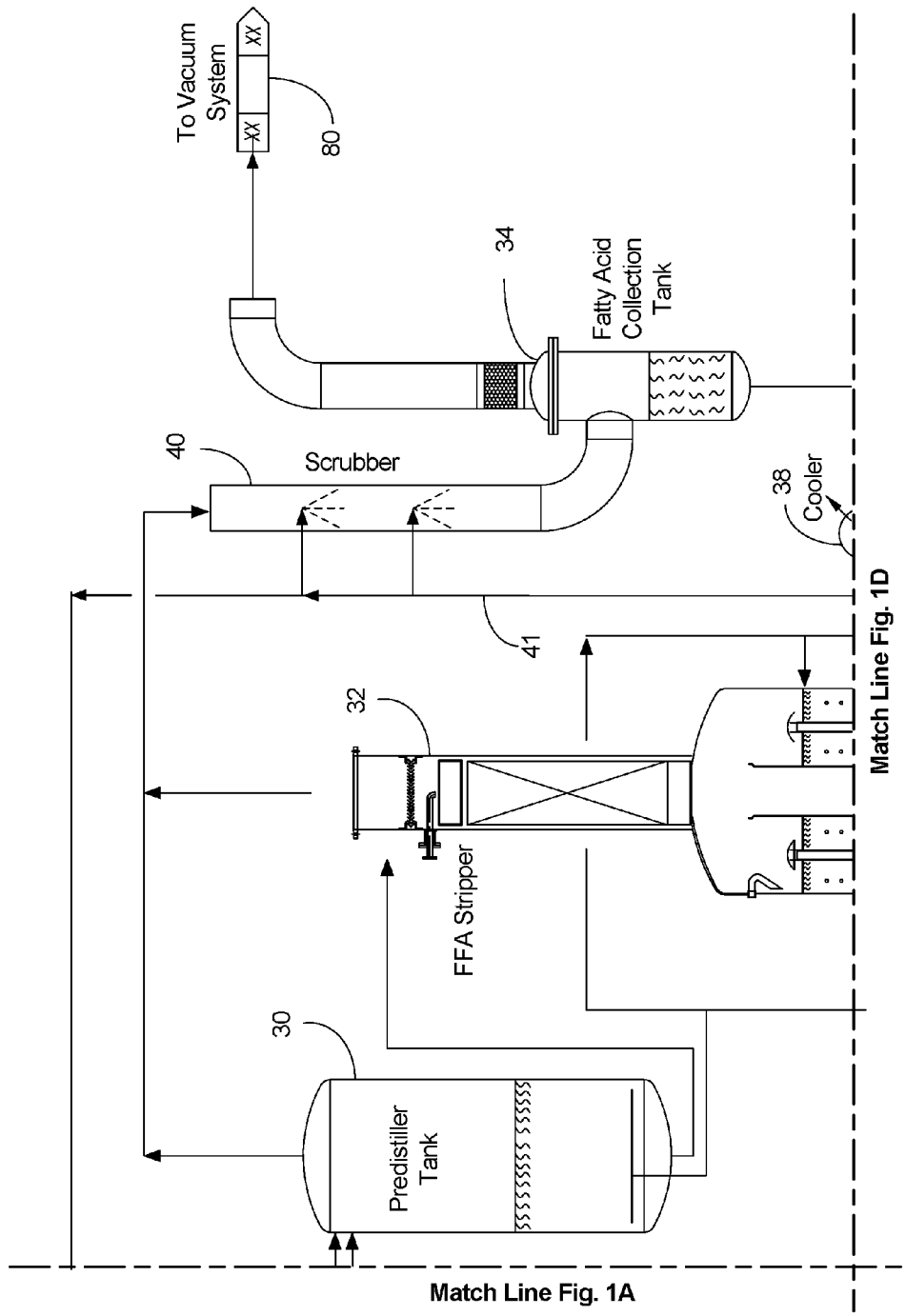
FIG. 1B is an expanded, detailed view of the upper right quarter of FIG. 1.
Figure 1C:
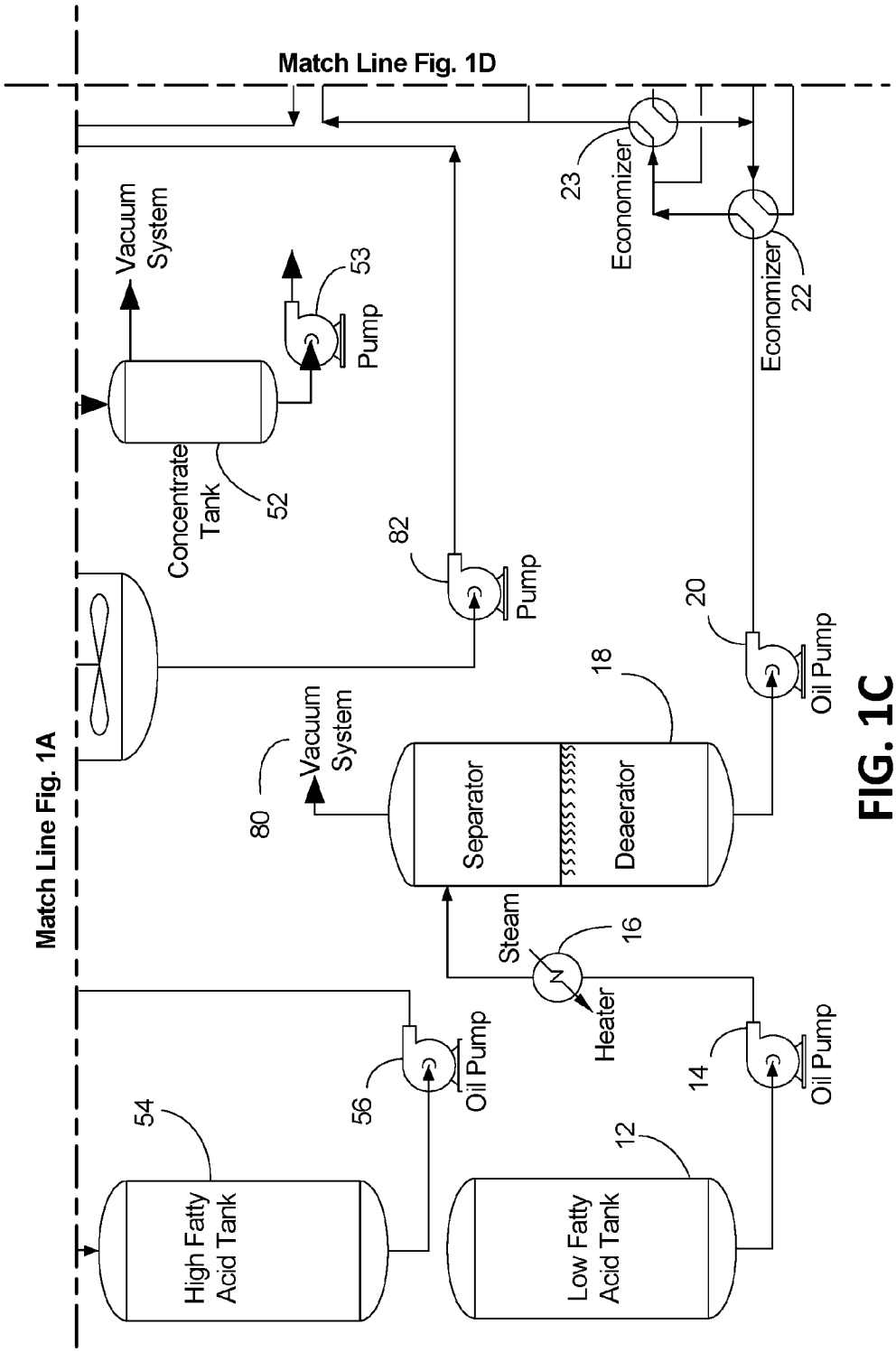
FIG. 1C is an expanded, detailed view of the lower left quarter of FIG. 1.
Figure 1D:
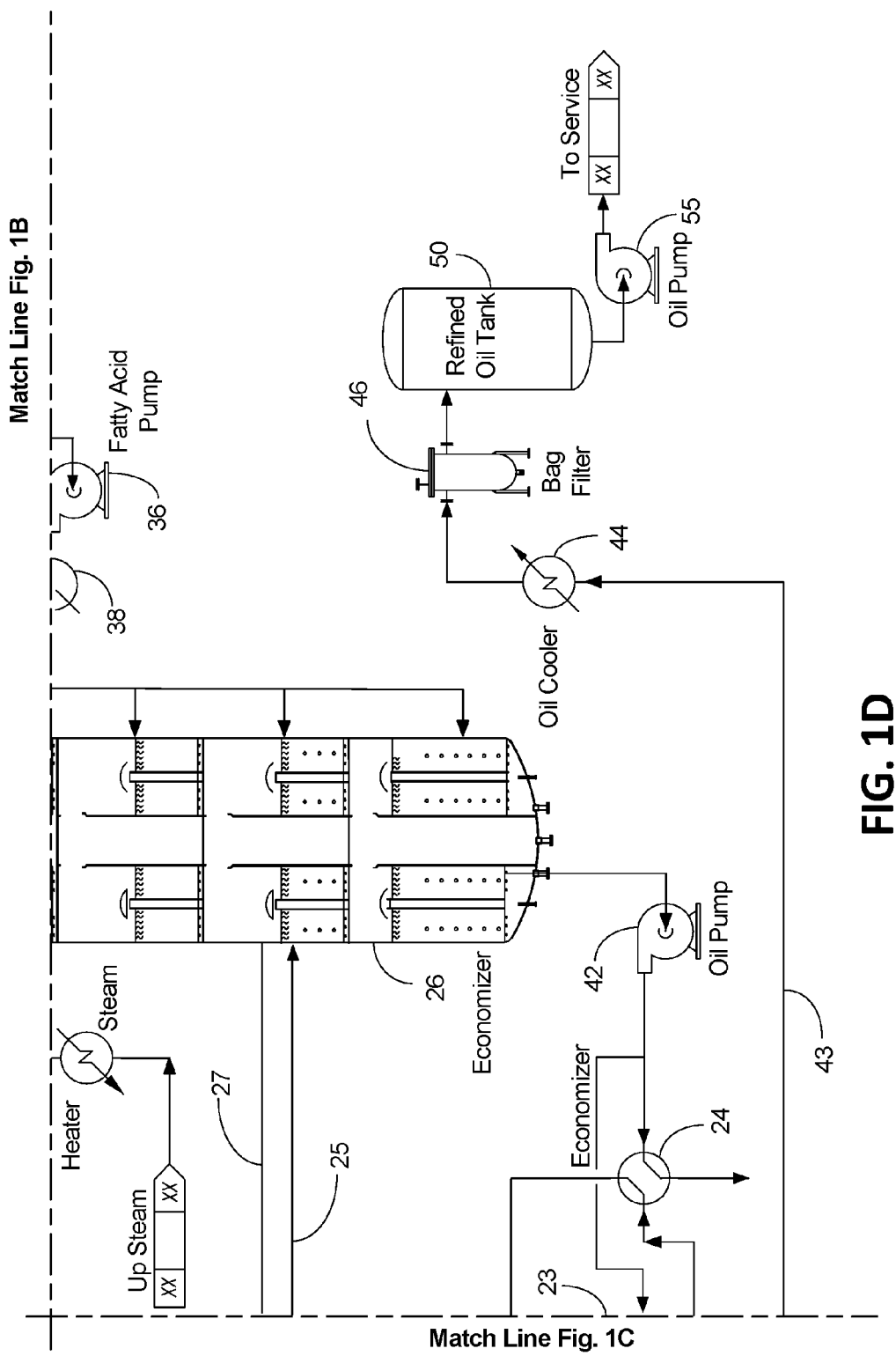
FIG. 1D is an expanded, detailed view of the lower right quarter of FIG. 1.
Figure 2:
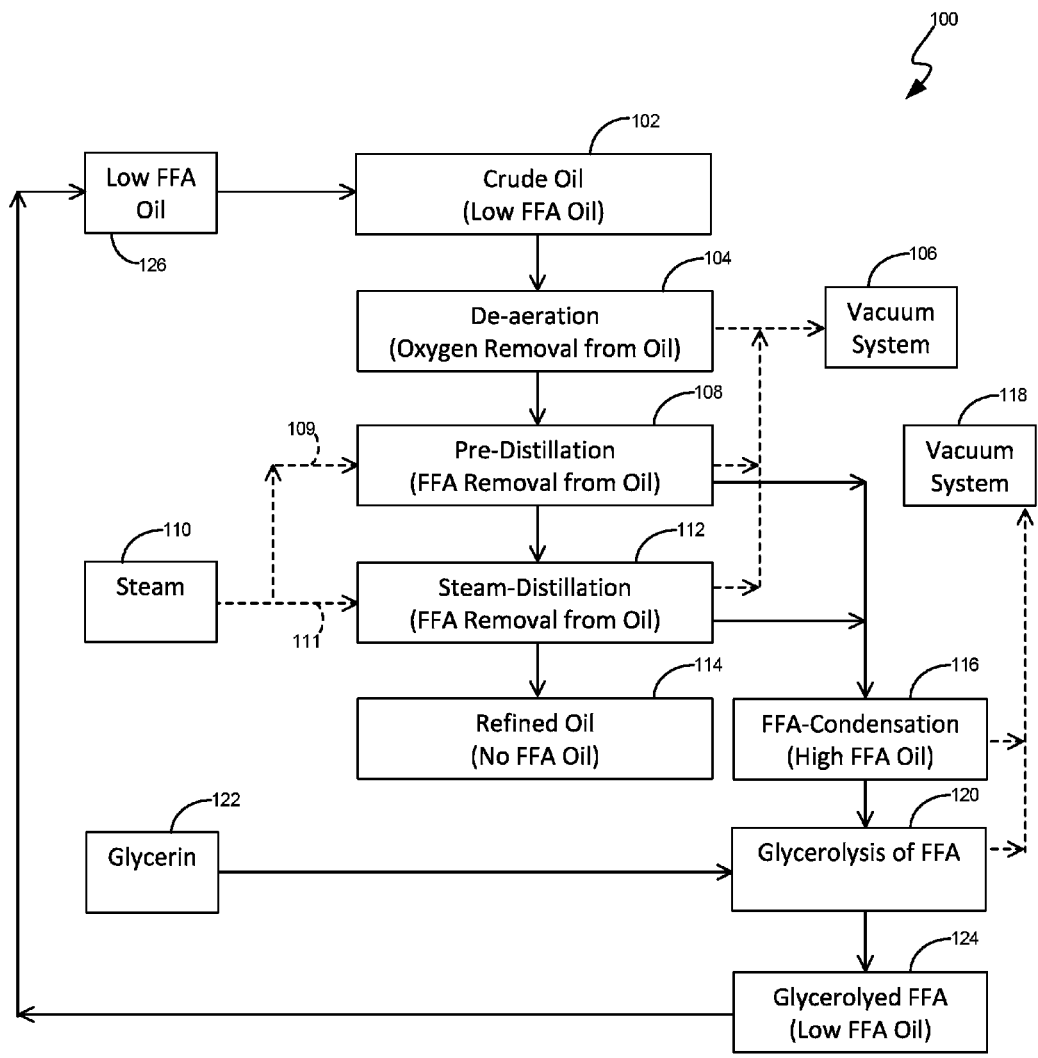
FIG. 2 is a flowchart showing steps for converting low FFA oils to no-FFA oils, according to an exemplary embodiment.

Step-1: As shown in FIGS. 1-2 generally at 10 and 100, the low free fatty acid ("LFFA") process according to certain implementations includes a FFA stripping step wherein LFFA oil (1-20% FFA by wt %) is first stripped of FFA. With reference to FIGS. 1A-D, the LFFA oil (shown in FIG. 2 at box 102) is pumped out of the low fatty acid tank 12 by a pump 14 through a start-up heater 16 to a deareator 18. In this implementation, the deareator 18 is configured to remove any air or moisture contained in the feedstock (shown in FIG. 2 at box 104). In various implementations, the deaerator 18 operates at temperature of 70° C.-120° C. (preferably between 80-100° C.) and a pressure of 25-200 mm Hg absolute depending upon the moisture content (preferred between 50-75 mm). The deaerator 18 is in sealed fluidic and hermetic communication with the vacuum system 80 to regulate the pressure inside the deaerator 18 (shown in FIG. 2 at box 106).

The deaerated-oil is pumped by pump PU-707 20 through a series of economizers 22, 23, 24, and (by way of line 25) 26, prior to being pumped (along line 27) into a pre-distiller 30 for pre-distillation (box 108). In this implementation, the temperature is raised to between 180° C.-300° C. (preferably between 230-280° C.) at a pressure of 1-10 mm Hg absolute (preferred between 3-5 mm) by hot oil or other means which could be electric or high-pressure steam. Steam is infused to act as a carrier of fatty acids vapors (box 110, line 109).

In certain implementations, the majority of the FFA flashes off in the pre-distiller 30. The remaining oil flows to an FFA stripper 32 where the remaining FFA is stripped by injecting steam (box 110, line 111) at various levels in the column (box 112). In this implementation, FFA-free, or refined oil is removed (box 114), and the steam strips the FFA and carries it with it as vapors into a fatty acid scrubber 40 where the FFA is condensed (box 116). In the scrubber 40, cooled FFA is used to scrub the FFA from steam vapors. The liquid FFA is collected in the fatty acid collection tank 34. The collected FFA is then pumped with a pump 36 through a cooler 38 back into the fatty acid scrubber 40 (shown at line 41). The vacuum system (box 118) is configured to achieve the desired pressure in the predistiller 30 and FFA stripper 32 as well as the scrubber 40 and fatty acid collection tank 34. In various embodiments, the vacuum system can be steam driven, such as with boosters and ejectors, or electricity driven, such as by blowers and mechanical pumps. In various implementations, several distinct vacuum systems (boxes 106 and 118) can be used, while in other implementations a single vacuum system, 80 is used throughout the system.

The stream from the bottom of the stripper 32 is pumped with pump 42. In various implementations, since the oil is at very high temperature, heat is recovered in economizers 22, 23, 24, 26 to heat the incoming oil. The finished product is refined oil with less than 1% (preferably below 0.5%) FFA. The refined oil flows out of the economizer 22 (shown at line 43) and is cooled in cooler HE-708 44 and polished in the bag filter 46 before being sent to the refined oil storage tank 50. The recovered fatty acids are again collected in the fatty acid collection tank 34 and pumped with an oil pump 55 back to the high fatty acid or feedstock storage tank 54 for feeding to the glycerin esterification in Step-1 with a pump 56.

Step-2: Various implementations have a glycerin-esterification step (box 120 in FIG. 2) wherein the HFFA oil produced in Step-1 is next pumped with a pump 56. in these implementations, the HFFA oil is pumped through a start-up heater 60 to a glyceroysis reactor 62. The reaction temperature is between 160° C. to 300° C. (preferably between 200-260° C.) at a pressure of 10 mm to 150 mm Hg absolute (preferably between 30-75 mm). Glycerin (box 122) is pumped from a glycerin tank 66 into the reactor 62 with a dozing pump 64. In certain implementations, the above reaction may be accomplished in multiple stage reactors in a continuous operation.

In the implementation of FIGS. 1 and 1A-D, the fatty-acid contained in HFFA oil reacts with glycerol and converts to oil. The byproduct of the reaction is water. This water is continuously removed from the reactor due to heat and vacuum (box 118). In these implementations, any glycerol that is vaporized and carried along with water is condensed in a first condenser 70 at a controlled temperature so only glycerin is condensed. The water vapors are allowed to pass on to another condenser 72 where the vapors are condensed. The water is collected in a condensate tank 52 and discharged with a pump 53. The condensate tank 52 is connected to a vacuum system 80. In various embodiments, the vacuum system can be steam driven, such as with boosters and ejectors, or electricity driven, such as by blowers and mechanical pumps. The finished product of the glycerolysis step is LFFA oil (box 124) and is transferred with a pump 82 to the FFA stripping step (Step 1, box 126) to completely remove FFA to less than about 1.0% or less than about 0.5%.

EXAMPLE 2

Oil Containing More than about 20% FFA

Figure 3:
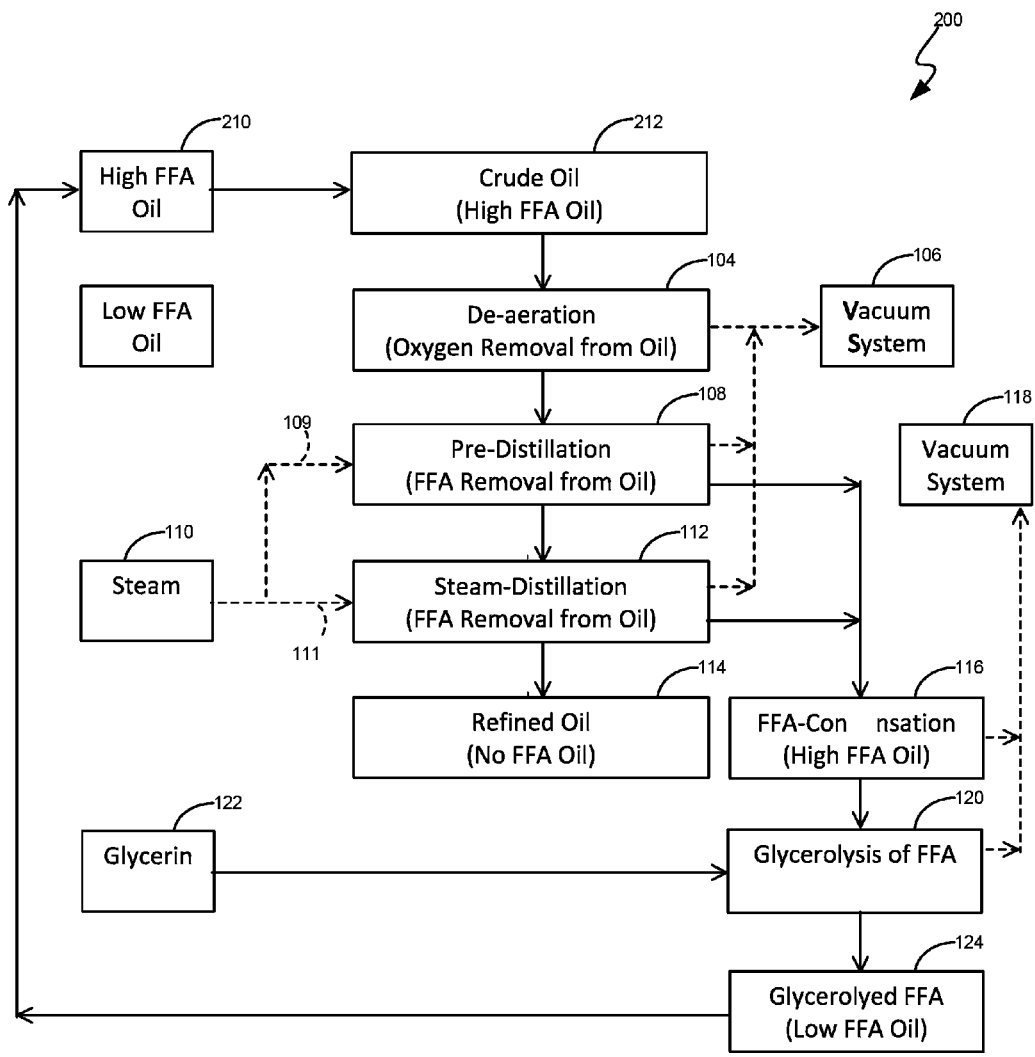
FIG. 3 is a flowchart showing steps for converting high FFA oils to no-FFA oils, according to an exemplary embodiment.

Step-1: As shown in FIGS. 1-1D and 3 at 10 and 200, in certain implementations, the disclosed high free fatty acid ("HFFA") process consists of a glycerin-esterification step wherein the HFFA containing oil (20-100% FFA, shown in FIG. 3 at box 210) is pumped from a high fatty acid tank 54 with a pump 56. The HFFA oil (box 212) is pumped through a start-up heater 60 to a reactor 62. The reaction temperature is between 160° C. to 300° C. (preferably between 200-260° C.) at a pressure of 10 mm to 150 mm Hg absolute (preferably between 30-75 mm Hg absolute).

Correspondingly, glycerin (box 122) is pumped from a glycerin tank 66 into the reactor 62 with a dozing pump 64. The fatty-acid contained in HFFA oil reacts with glycerol and converts to oil (box 120). A byproduct of the reaction is water. The water is continuously removed from the reactor due to heat and vacuum. Any glycerol that is vaporized and carried along with water is condensed in a first condenser 70 at a controlled temperature so only glycerol is condensed. The water vapors are allowed to pass on to another condenser 72 where it is condensed. The water is collected in a condensate tank 52 and discharged with a pump 53. The condensate tank 52 can also be connected to a vacuum system 80. In various embodiments, the vacuum system can be steam driven, such as with boosters and ejectors, or electricity driven, such as by blowers and mechanical pumps. In various implementations, several distinct vacuum systems (boxes 106 and 118) can be used, while in other implementations a single vacuum system, 80 is used throughout the system.

The reaction presented above may be accomplished in multiple stage reactors in a continuous operation. The finished product is LFFA oil and is transferred with a pump 82 to the FFA stripping step (Step-2 below) to completely remove FFA to less than about 1.0% or less than about 0.5%, for example.

Step-2: The disclosed process further consists of an FFA stripping step wherein glycerin-esterified oil from Step-1 (box 126) is stripped of FFA. The LFFA oil is pumped with pump PU-701L 14 to a pre-distiller TK-704 30, as previously described (boxes 104-116). In this implementation, the temperature is raised to between 180° C.-300° C. (preferably between 230-280° C.) at a pressure of 1-10 mm Hg absolute (preferably between 3-5 mm Hg absolute).

Again, the majority of the FFA flashes off in the pre-distiller 30 (box 108). The oil flows over to an FFA stripper 32 where the remaining FFA is stripped by injecting steam (box 110) at the various levels in the column. The steam strips FFA (box 112) and carries it with it into the fatty acid scrubber 40 where the FFA is condensed (box 116).

In various embodiments, cooled FFA is used to scrub the FFA from steam vapors. The liquid FFA is collected in the fatty acid collection tank 34. The collected FFA is pumped with a pump 36 through a cooler 38 into the fatty acid scrubber 40 (shown at line 41). The stream from the bottom of the stripper 32 is pumped with a pump 42. Since the oil is at very high temperature, heat is recovered in economizers 22, 23, 24 to heat the incoming oil. The finished product is refined oil with less than about 1.0% FFA, less than 1.0% FFA, or less than about 0.5% FFA. The refined oil (following line 43) is subsequently cooled in a cooler 44 and polished in the bag filter 46 before being sent to storage. The recovered fatty acids are collected in a collection tank 34 and pumped back to the feedstock storage tank 54 for feeding to the glycerin esterification in Step-1.

Although the disclosure has been described with reference to preferred embodiments, persons skilled in the art will recognize that changes may be made in form and detail without departing from the spirit and scope of the disclosed apparatus, systems and methods.

What is claimed is:

1. A system for producing oil having less than about 1.0% free fatty acids from an oil containing up to 100% free fatty acids, comprising:
   a. a reactor configured to react oil containing up to 100% free fatty acids with glycerin in the absence of a catalyst at high temperature and low pressure to produce a stream of oil having up to about 20% free fatty acids;
   b. a pre-distiller configured to purify the oil having up to about 20% free fatty acids by steam distillation at high temperature and low pressure;
   c. a free fatty acid stripper configured to steam-strip free fatty acids and produce:
      i. oil having less than about 1.0% free fatty acids; and
      ii. stripped free fatty acids;
   d. a fatty acid collection tank configured to recover the stripped free fatty acids through condensation; and
   e. a storage tank configured for collecting and storing oil having less than about 1.0% free fatty acids.

2. The system of claim 1, wherein the system is configured to react the stripped free fatty acids with glycerin at high temperature and low pressure to produce oil with up to about 20% free fatty acids.

3. The system of claim 2, further comprising a scrubber configured to utilize cooled free fatty acids to scrub additional free fatty acid from steam vapors.

4. The system of claim 2, wherein the free fatty acid stripper is configured to strip the free fatty acids from the oil by injecting steam at an elevated temperature and reduced pressure.

5. The system of claim 2, further comprising a vacuum system.

6. The system of claim 2, further comprising a first condenser configured to condense glycerol.

7. The system of claim 6, further comprising a second condenser configured to condense water.

* * * * *